(12) United States Patent
Richardson, Jr.

(10) Patent No.: US 10,181,711 B2
(45) Date of Patent: Jan. 15, 2019

(54) SPACER DEVICE

(71) Applicant: Albert S. Richardson, Jr., Lexington, MA (US)

(72) Inventor: Albert S. Richardson, Jr., Lexington, MA (US)

(73) Assignee: AR Patents, LLC, Lexington, MA (US)

( * ) Notice: Subject to any disclaimer, the term of this patent is extended or adjusted under 35 U.S.C. 154(b) by 893 days.

(21) Appl. No.: 14/581,616

(22) Filed: Dec. 23, 2014

(65) Prior Publication Data

US 2015/0171610 A1 Jun. 18, 2015

Related U.S. Application Data

(62) Division of application No. 13/008,112, filed on Jan. 18, 2011, now Pat. No. 8,981,227.
(Continued)

(51) Int. Cl.
*H02G 7/12* (2006.01)
*H02G 1/02* (2006.01)

(52) U.S. Cl.
CPC ............. *H02G 7/125* (2013.01); *H02G 1/02* (2013.01); *H02G 7/12* (2013.01); *Y10T 29/49227* (2015.01); *Y10T 29/49815* (2015.01)

(58) Field of Classification Search
CPC ............ H02G 7/125; H02G 1/02; H02G 7/00; H02G 7/02; H02G 7/04; H02G 7/12;
(Continued)

(56) References Cited

U.S. PATENT DOCUMENTS 761,287 A 5/1904 Cummings
832,711 A 10/1906 Weber
(Continued)

FOREIGN PATENT DOCUMENTS

EP 0113035 A1 11/1984
EP 0665621 A1 2/1995
(Continued)

OTHER PUBLICATIONS

Notice of Allowance and Fees Due for U.S. Appl. No. 15/383,371 dated Feb. 23, 2018.
(Continued)

*Primary Examiner* — Angel R Estrada
(74) *Attorney, Agent, or Firm* — Hamilton, Brook, Smith & Reynolds, P.C.

(57) ABSTRACT

A spacer device includes an elongate spacing member extending a longitudinal axis for securing to electrical transmission lines, and has a minimum thickness $d_m$. At least one thickened portion having a thickness $T_t$ and length $d_t$ is positioned intermediate along the spacing member to form at least two column lengths $L_c$ separated by the at least one thickened portion. Each column length $L_c$ has a portion with the minimum thickness $d_m$. The thickness $T_t$ and length $d_t$ of the at least one thickened portion can be at least two times the minimum thickness $d_m$ to form at least one end support for the at least two column lengths $L_c$, such the at least two column lengths $L_c$ behave as separate Euler type columns for producing increased Euler buckling strength with a minimal increase in weight.

19 Claims, 12 Drawing Sheets

Related U.S. Application Data

(60) Provisional application No. 61/296,203, filed on Jan. 19, 2010.

(58) Field of Classification Search
CPC ...... H02G 7/14; H02G 1/04; Y10T 29/49227; Y10T 29/49815
USPC .... 174/146, 138 G, 138 E, 40 R, 42, 45 TD, 174/40 TD; 29/868, 592, 592.1; 248/61, 248/74.1, 74.2
See application file for complete search history.

(56) References Cited

U.S. PATENT DOCUMENTS

| | | |
|---|---|---|
| 900,379 A | 10/1908 | Janni |
| 1,687,449 A | 10/1928 | Hill |
| 2,974,184 A | 3/1961 | Mather |
| 2,976,344 A | 3/1961 | Bethel |
| 3,111,553 A | 11/1963 | Bethea |
| 3,357,694 A | 12/1967 | Kidder et al. |
| 3,463,870 A | 8/1969 | Eucker |
| 3,659,034 A | 4/1972 | Rawlins et al. |
| D242,765 S | 12/1976 | Patrick |
| 4,012,582 A | 3/1977 | Hawkins |
| 4,525,596 A | 6/1985 | Diana |
| 4,646,504 A | 3/1987 | Britvec |
| 5,021,612 A | 6/1991 | Joffe |
| 5,581,051 A | 12/1996 | Hill |
| 5,593,327 A | 1/1997 | Hlinsky et al. |
| 6,008,453 A | 12/1999 | Richardson, Jr. |
| 6,072,120 A | 6/2000 | Matsuzaki et al. |
| 6,303,856 B1 | 10/2001 | Bello |
| 7,701,688 B2 | 4/2010 | Jeon |
| 8,981,227 B2 | 3/2015 | Richardson, Jr. |
| 9,022,357 B2 | 5/2015 | Argyle et al. |
| 9,136,683 B2 | 9/2015 | Hyde et al. |
| 9,444,240 B2 | 9/2016 | Argyle et al. |
| 10,014,677 B2 | 7/2018 | Richardson, Jr. |
| 10,063,043 B2 | 8/2018 | Richardson, Jr. |
| 2012/0031646 A1 | 2/2012 | Richardson, Jr. |
| 2014/0144673 A1 | 5/2014 | Richardson, Jr. |
| 2017/0149227 A1 | 5/2017 | Richardson, Jr. |

FOREIGN PATENT DOCUMENTS

| | | |
|---|---|---|
| JP | 2095112 A | 4/1990 |
| JP | 2179212 A | 7/1990 |
| WO | WO 2015/116396 A1 | 8/2015 |

OTHER PUBLICATIONS

Notice of Allowance and Fees Due for U.S. Appl. No. 14/171,220 dated May 3, 2018.

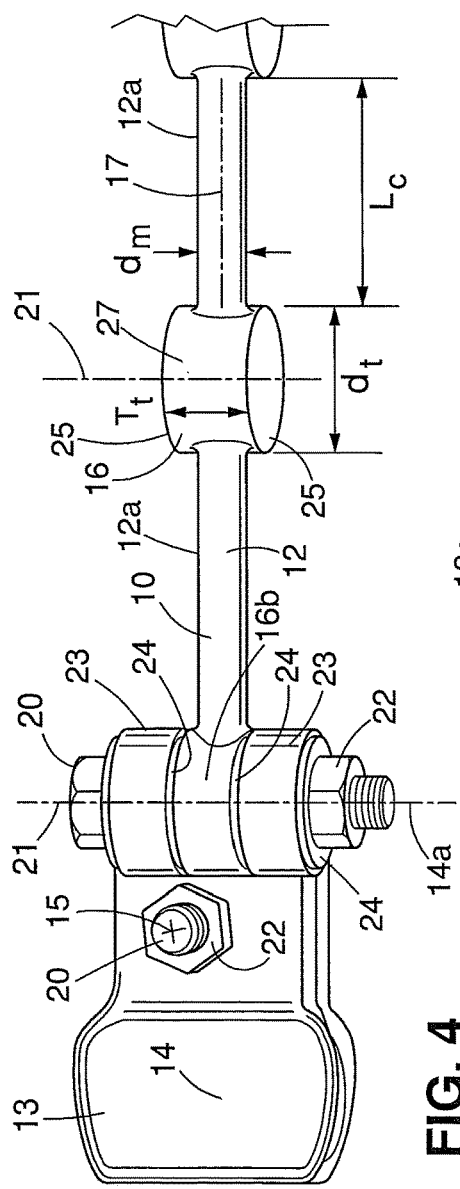
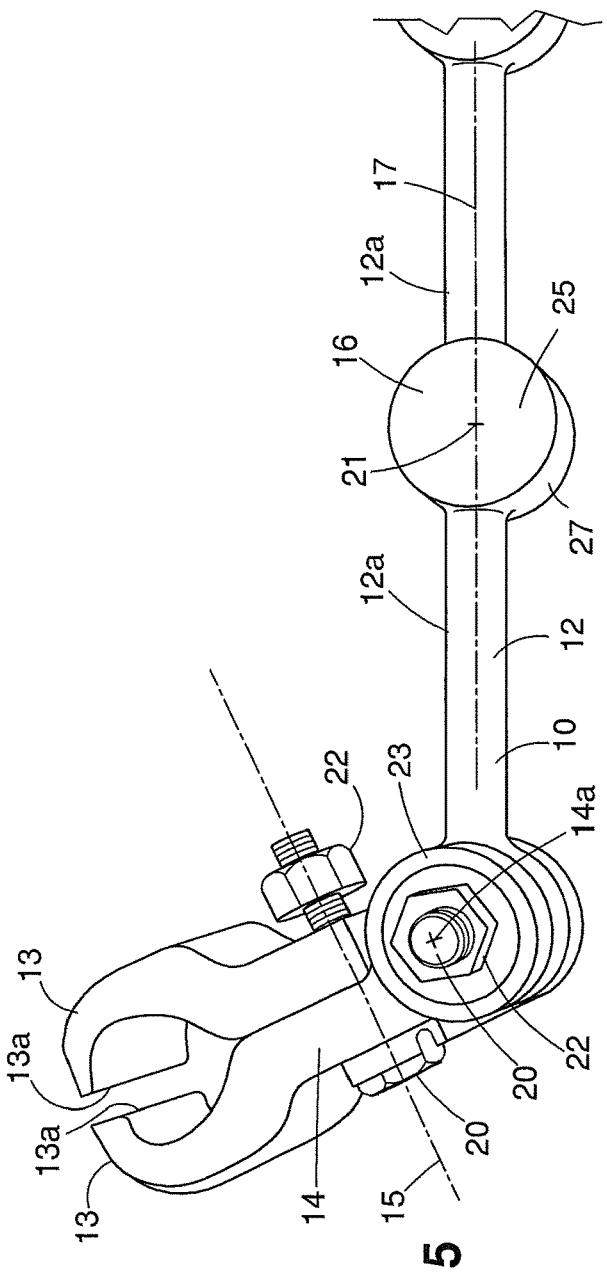
FIG. 4
FIG. 5

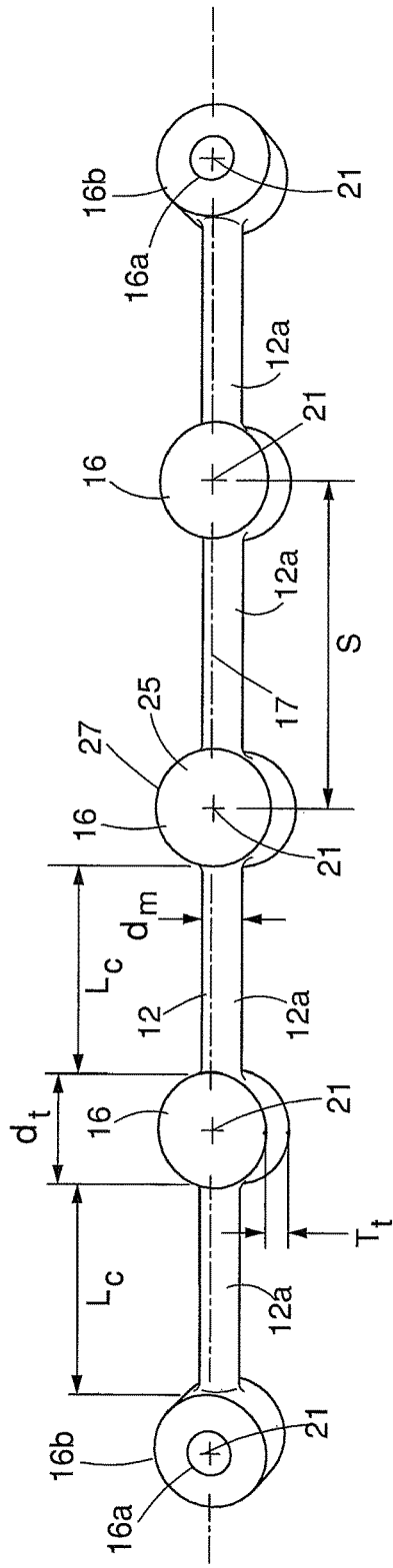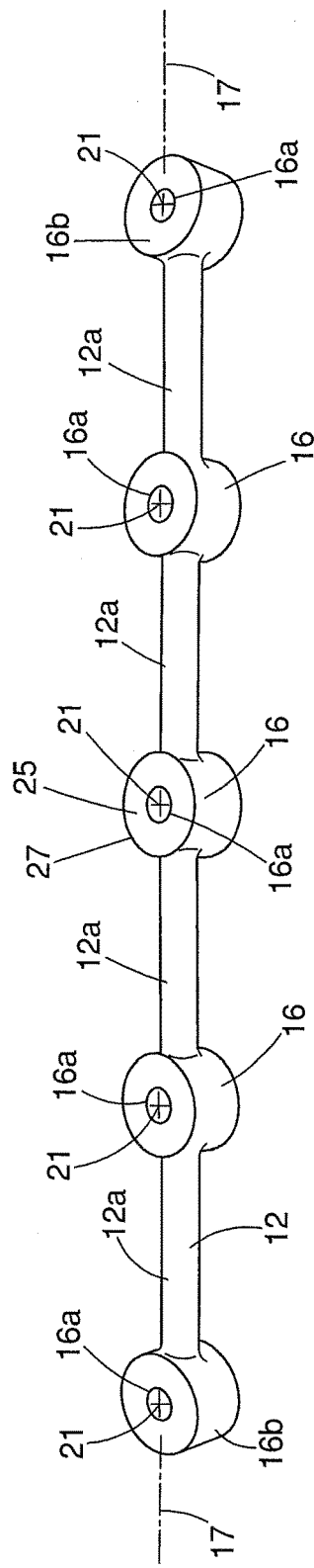
FIG. 7
FIG. 8A

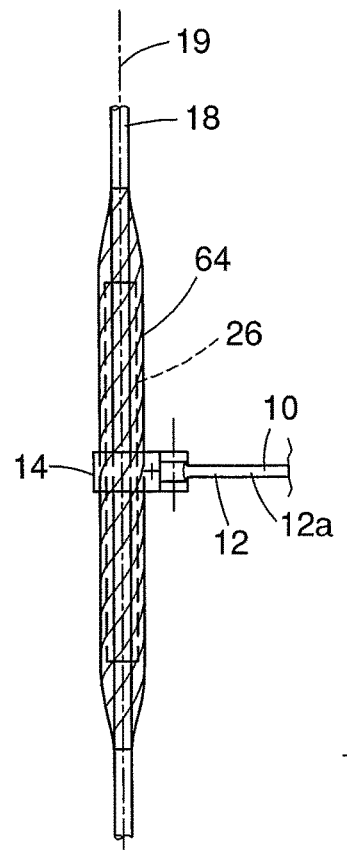
FIG. 12
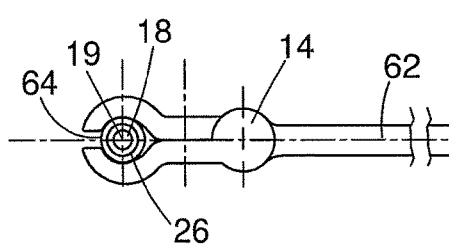
FIG. 13B
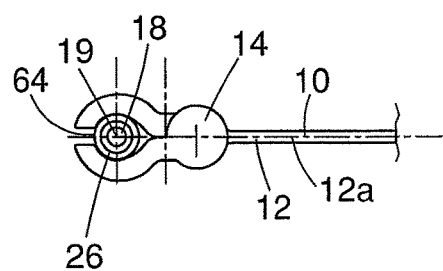
FIG. 13A
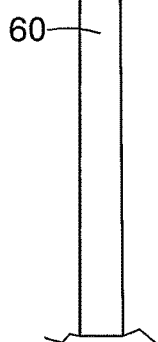

SPACER DEVICE

RELATED APPLICATION(S)

This application is a divisional of U.S. application Ser. No. 13/008,112, filed Jan. 18, 2011, which claims the benefit of U.S. Provisional Application No. 61/296,203, filed on Jan. 19, 2010. The entire teachings of the above applications are incorporated herein by reference.

BACKGROUND

Electrical transmission lines, cables or conductors can be subject to galloping during storms, which can cause damage to the transmission line system. If damage is extensive, repairs can be costly and time consuming.

SUMMARY

The present invention can provide a spacer device including an elongate spacing member extending along a longitudinal axis for securing to electrical transmission lines, and can have a minimum thickness $d_m$. At least one thickened portion having a thickness $T_t$ and length $d_t$ can be positioned intermediate along the spacing member to form at least two column lengths $L_c$ separated by the at least one thickened portion. Each column length $L_c$ can have a portion with the minimum thickness $d_m$. The thickness $T_t$ and length $d_t$ of the at least one thickened portion can be at least two times the minimum thickness $d_m$ to form at least one end support for the at least two column lengths $L_c$, such that the at least two column lengths $L_c$ behave as separate Euler type columns for producing increased Euler buckling strength with a minimal increase in weight.

In particular embodiments, the thickened portion can have a thickness $T_t$ that is at least two times the minimum thickness $d_m$ of the spacing member, and a length $d_t$ that is at least three times the minimum thickness $d_m$. The spacing member can have a column length to minimum thickness $L_c/d_m$ ratio of about 5 to 18, a thickened portion thickness to spacing member minimum thickness $T_t/d_m$ ratio of about 1.5 to 3, and a thickened portion length to spacing member minimum thickness $d_t/d_m$ ratio of about 2 to 5 for producing increased Euler buckling strength with a minimal increase in weight. In some embodiments, the $L_c/d_m$ ratio can be about 6 to 7, the $T_t/d_m$ ratio can be about 1.75 to 2.5, and the $d_t/d_m$ ratio can be about 2.5 to 3.5. The spacing member can be a rod having a length of about 1½ to 3 feet long, and having a minimum thickness $d_m$ of about ⅜ to ¾ inches. The at least one thickened portion can have a thickness $T_t$ of about 1 to 2 inches, and a length $d_t$ of about 1½ to 2½ inches. The at least one thickened portion can be integrally formed on the spacing member. At least two thickened portions can be spaced apart about 5 to 11 inches. The at least one thickened portion can be cylindrical in shape and can have a central axis orthogonal to the longitudinal axis of the spacing member. The at least one thickened portion can have a diameter of about 1½ to 2½ inches. First and second clamps can be secured to opposite ends of the spacing member for securing to respective electrical transmission lines. The clamps can be capable of rotating relative to the spacing member. The spacer device can be capable of spacing two electrical transmission lines about 30 to 32 inches apart. The elongate spacing member can be a first spacing member, and the spacer device can further include a second elongate spacing member secured to the first spacing member and can have at least a third clamp secured to an end of the second spacing member for securing to at least another electrical transmission line.

The present invention can also provide a spacer device for electrical transmission lines including an elongate spacing rod having a length of about 1½ to 3 feet long, and a nominal thickness of about ⅜ to ¾ inches. A series of spaced apart thickened portions can be integrally formed on the spacing rod. The thickened portions can be at least two times thicker than the nominal thickness of the spacing rod and spaced about 5 to 8 inches apart for producing increased Euler buckling strength with a minimal increase in weight.

The present invention can also provide a spacer device including an elongate spacing rod extending along a longitudinal axis for securing to electrical transmission lines, and having a minimum diameter $d_m$. At least one thickened portion can be positioned intermediate along the spacing rod to form at least two column lengths $L_c$ separated by the at least one thickened portion. The at least one thickened portion can be cylindrically shaped with a central axis orthogonal to the longitudinal axis of the spacing rod, and can have a diameter $d_t$ and thickness $T_t$ large enough to form at least one end support for the at least two column lengths $L_c$, such that the at least two column lengths $L_c$ behave as separate Euler type columns for producing increased Euler buckling strength with a minimal increase in weight.

The present invention can also provide a spreading device for spreading cables apart including a first spreading arm having a proximal end and a distal end, and a second spreading arm having a proximal end and a distal end. The distal ends of the first and second spreading arms can be configured for engaging respective cables. The proximal ends of the first and second spreading arms can be pivotally connected together by a pivot point. The pivot point can be configured to permit pivoting of the first and second arms relative to each other between an acute angle and just beyond 180°, for spreading the respective cables apart and locking in a spread position.

In particular embodiments, a handle can be pivotally connected to the pivot point for moving the first and second spreading arms between the acute angle and just beyond 180°. The pivot point can include a mechanical stop for preventing rotation of the first and second spreading arms past just beyond 180°.

The present invention can also provide a spacer damper device for electrical transmission lines including two polymeric sleeves, each about 4 to 5 feet long covering a portion of two spaced apart transmission line cables. Two helical armor rods, each about 6 to 7 feet long can be wrapped around a polymeric sleeve. Ends of the armor rods can be wrapped around the cables. A spacing member can have two clamps, each for clamping over a cable at a region to clamp over an armor rod and polymeric sleeve, thereby forming a constrained viscoelastic layer where the polymeric sleeve deforms in shear when the cable bends underneath the clamp, thereby providing damping.

The present invention can also provide a damper device for electrical transmission lines including a polymeric sleeve covering a portion of a transmission line cable. A rod can be wrapped around the polymeric sleeve. Ends of the rod can be wrapped around the cable. A clamp can be clamped over the rod and polymeric sleeve, thereby forming a constrained viscoelastic layer where the polymeric sleeve deforms in shear when the cable bends underneath the clamp, thereby providing damping.

In particular embodiments, the polymeric sleeve can be about 4 to 5 feet long, and the rod can be a helical armor rod about 6 to 7 feet long. The clamp can be a first clamp and the transmission line cable can be a first transmission line cable. The damper device can further include a spacing member to which the first clamp is mounted, and a second clamp mounted to the spacing member for clamping to a second transmission line cable. In some embodiments, the clamp can be mounted to a member extending from a transmission tower.

The present invention can also provide a method of spacing two electrical transmission lines with a spacer device including securing an elongate spacing member to the two electrical transmission lines. The elongate spacing member can extend along a longitudinal axis, and can have a minimum thickness $d_m$. At least one thickened portion having a thickness $T_t$ and length $d_t$ can be positioned intermediate along the spacing member to form at least two column lengths $L_c$ separated by the at least one thickened portion. Each column length $L_c$ can have a portion with a minimum thickness $d_m$. The thickness $T_t$ and length $d_t$ of the at least one thickened portion can be at least two times the minimum thickness $d_m$ to form at least one end support for the at least two column lengths $L_c$, such that the at least two column lengths $L_c$ behave as separate Euler type columns for producing increased Euler buckling strength with a minimal increase in weight.

In particular embodiments, the thickened portion can have a thickness $T_t$ that is at least two times the minimum thickness $d_m$ of the spacing member, and a length $d_t$ that is at least three times the minimum thickness $d_m$. The spacing member can have a column length to minimum thickness $L_c/d_m$ ratio of about 5 to 18, a thickened portion thickness to spacing member minimum thickness $T_t/d_m$ ratio of about 1.5 to 3, and a thickened portion length to spacing member minimum thickness $d_t/d_m$ ratio of about 2 to 5 for producing increased Euler buckling strength with a minimal increase in weight. In some embodiments, the $L_c/d_m$ ratio can be about 6 to 7, the $T_t/d_m$ ratio can be about 1.75 to 2.5 and the $d_t/d_m$ ratio can be about 2.5 to 3.5. The spacing member can be a rod with a length of about 1½ to 3 feet long, and a minimum thickness $d_m$ of about ⅜ to ¾ inches. The at least one thickened portion can have a thickness $T_t$ of about 1 to 2 inches, and a length $d_t$ of about 1½ to 2½ inches. The at least one thickened portion can be integrally formed on the spacing member. At least two thickened portions can be spaced apart about 5 to 11 inches. The at least one thickened portion can be cylindrical in shape, and with a central axis orthogonal to the longitudinal axis of the spacing member. The at least one thickened portion can have a diameter of about 1½ to 2½ inches. First and second clamps that are on opposite ends of the spacing member can be secured to respective electrical transmission lines. The clamps can be allowed to rotate relative to the spacing member. The two electrical transmission lines can be spaced about 30 to 32 inches apart. The elongate spacing member can be a first spacing member, and the spacer device can further include a second elongate spacing member secured to the first spacing member and can have at least a third clamp secured to an end of the second spacing member for securing to at least another electrical transmission line.

The present invention can also provide a method of spacing two electrical transmission lines with a spacer device including securing an elongate spacing rod to the two electrical transmission lines. The elongate spacing rod can have a length of about 1½ to 3 feet long, and a nominal thickness of about ⅜ to ¾ inches. A series of spaced apart thickened portions can be integrally formed on the spacing rod. The thickened portions can be at least two times thicker than the nominal thickness of the spacing rod and spaced of about 5 to 8 inches apart for producing increased Euler buckling strength with a minimal increase in weight.

The present invention can also provide a method of spacing two electrical transmission lines with a spacer device including securing an elongate spacing rod to the two electrical transmission lines. The elongate spacing rod can extend along a longitudinal axis and have a minimum diameter $d_m$. At least one thickened portion can be positioned intermediate along the spacing rod to form at least two column lengths $L_c$ separated by the at least one thickened portion. The at least one thickened portion can be cylindrically shaped with a central axis orthogonal to the longitudinal axis of the spacing rod, and can have a diameter $d_t$ and thickness $T_t$ large enough to form at least one end support for the at least two column lengths $L_c$, such that the at least two column lengths $L_c$ behave as separate Euler type columns for producing increased Euler buckling strength with a minimal increase in weight.

The present invention can also provide a method of spreading two cables apart including providing a spreading device with first and second spreading arms each having proximal and distal ends. The distal ends of the first and second spreading arms can engage respective cables. The proximal ends of the first and second spreading arms can be pivotally connected together by a pivot point. The pivot point can be configured to permit pivoting of the first and second arms relative to each other. The arms can be pivoted from an acute angle to just beyond 180°, for spreading the respective cables apart and locking in a spread position.

In particular embodiments, the first and second spreading arms can be moved between the acute angle and just beyond 180° with a handle pivotably connected to the pivot point. The first and second spreading arms can be prevented from rotating past just beyond 180° with a mechanical stop included with the pivot point. The two cables can be two electrical transmission lines, and can be spread from an initial distance of about 18 inches to a distance of about 30 to 32 inches. A spacing device can be secured to the two electrical transmission lines for maintaining the distance of about 30 to 32 inches.

The present invention can also provide a method of damping electrical transmission lines including covering two spaced apart transmission line cables with two polymeric sleeves, each about 4 to 5 feet long covering a portion of the two spaced apart transmission line cables. Two helical armor rods, each about 6 to 7 feet long can be wrapped around a polymeric sleeve. Ends of the armor rods can be wrapped around the cables. A spacing member can be secured to the two transmission line cables. The spacing member can have two clamps, each for clamping over a cable at a region to clamp over an armor rod and polymeric sleeve, thereby forming a constrained viscoelastic layer where the polymeric sleeve deforms in shear when the cable bends underneath the clamp, thereby providing damping.

The present invention can also provide a method of damping an electrical transmission line including covering a portion of an electrical transmission line cable with a polymeric sleeve. A rod can be wrapped around the polymeric sleeve. Ends of the rod can be wrapped around the cable. A clamp can be secured over the rod and polymeric sleeve, thereby forming a constrained viscoelastic layer where the polymeric sleeve deforms in shear when the cable bends underneath the clamp, thereby providing damping.

In particular embodiments, the polymeric sleeve can be about 4 to 5 feet long, and the rod can be a helical armor rod about 6 to 7 feet long. The clamp can be a first clamp and the transmission line cable can be a first transmission line cable. A spacing member can be included to which the first clamp is mounted, and a second clamp mounted to the spacing member for clamping to a second transmission line cable. In some embodiments, the clamp can be mounted to a member extending from a transmission tower.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 4 and 5 are top and side views of one end of the spacer device of FIG. 1, showing an embodiment of a rotatable clamp.

FIG. 7 is a top perspective view of an embodiment of a spacer rod.

FIG. 8A is a top perspective view of another embodiment of a spacer rod.

FIG. 12 is a top view of a portion of another embodiment of a spacer device in the present invention.

FIG. 13A is a side view of the portion of the spacer device of FIG. 12.

FIG. 13B is a schematic drawing of a clamp extending from an insulator mounted to a tower, and clamping an armor rod polymeric sleeve sandwich around a conductor.

DETAILED DESCRIPTION

Figure 1:
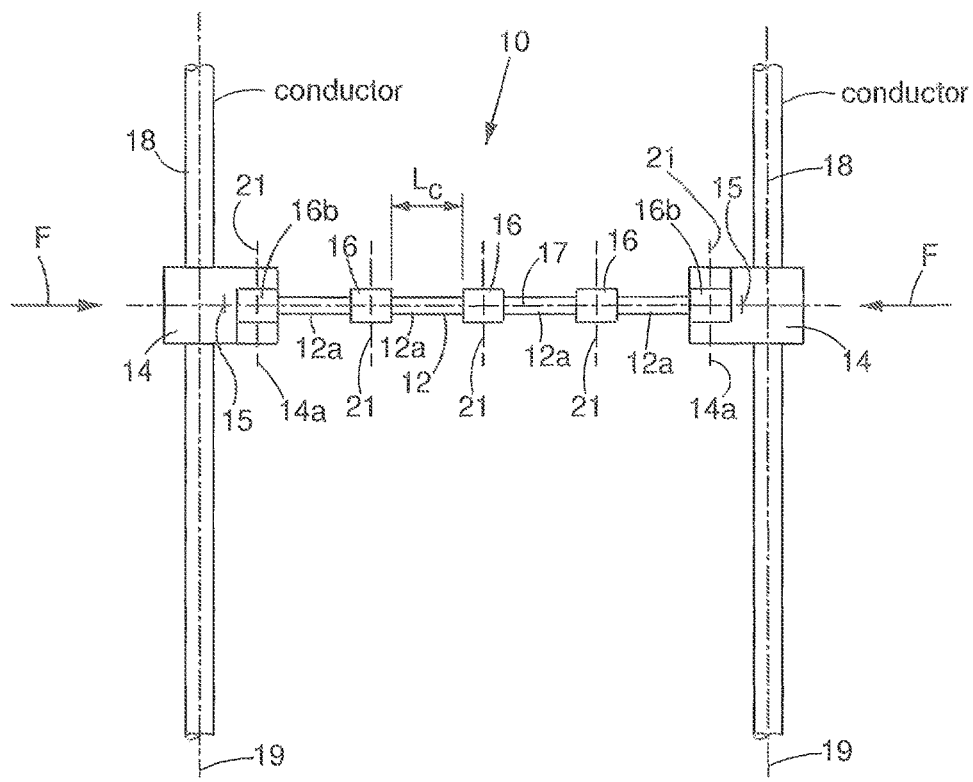
FIG. 1 is a top view on an embodiment of a spacer device in the present invention.
Figure 2:
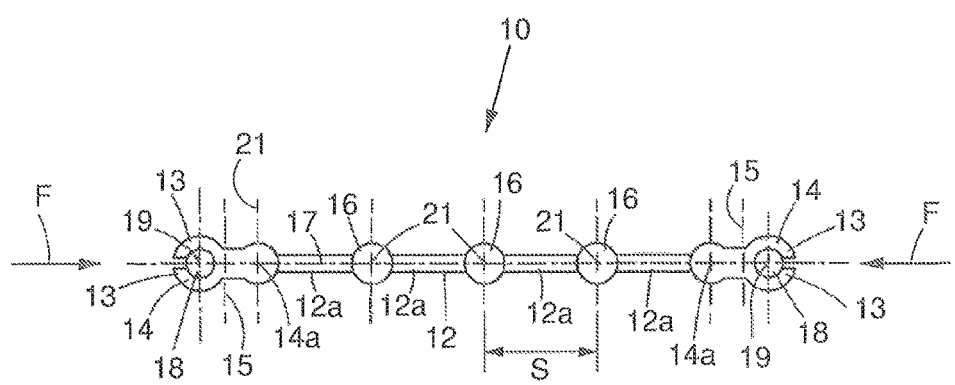
FIGS. 2 and 3 are side views of the spacer device of FIG. 1.

A description of example embodiments of the invention follows.

FIGS. 1-8A depict an embodiment of a spacer device 10 in the present invention which can be secured to lines, cables or conductors 18 extending along axes 19, such as electrical transmission lines, cables or conductors, and can operate as a spacer twister device and/or a spacer damper device. Spacer device 10 can space the conductors 18 apart from each other, can dampen vibrations, and can reduce or prevent galloping of the cables or conductors 18 during storms. The spacer device 10 can have an elongated spacing or spacer member or rod 12 extending along a longitudinal axis 17 with rotatable clamps 14 at opposite ends, which can pivot about pivot points or axes 14a. In some situations, the clamps 14 can be fixed, if desired. Rotation of the clamps 14 can allow twisting of the conductors 18 which can change or alter aerodynamic lift characteristics of the conductors 18 in heavy winds, and can reduce or prevent galloping, as well as dampen vibrations. The spacer rod 12 can have a series of spaced apart thickened knobs, bulges, protuberances, members, or portions 16 along its length. The thickened portions 16 can increase the stiffness and buckling strength of the spacer rod 12 for resisting compressive buckling forces F, and Euler type buckling, while minimizing the nominal or minimal thickness (or diameter), the weight, and the cost of the spacer rod 12.

Figure 3:
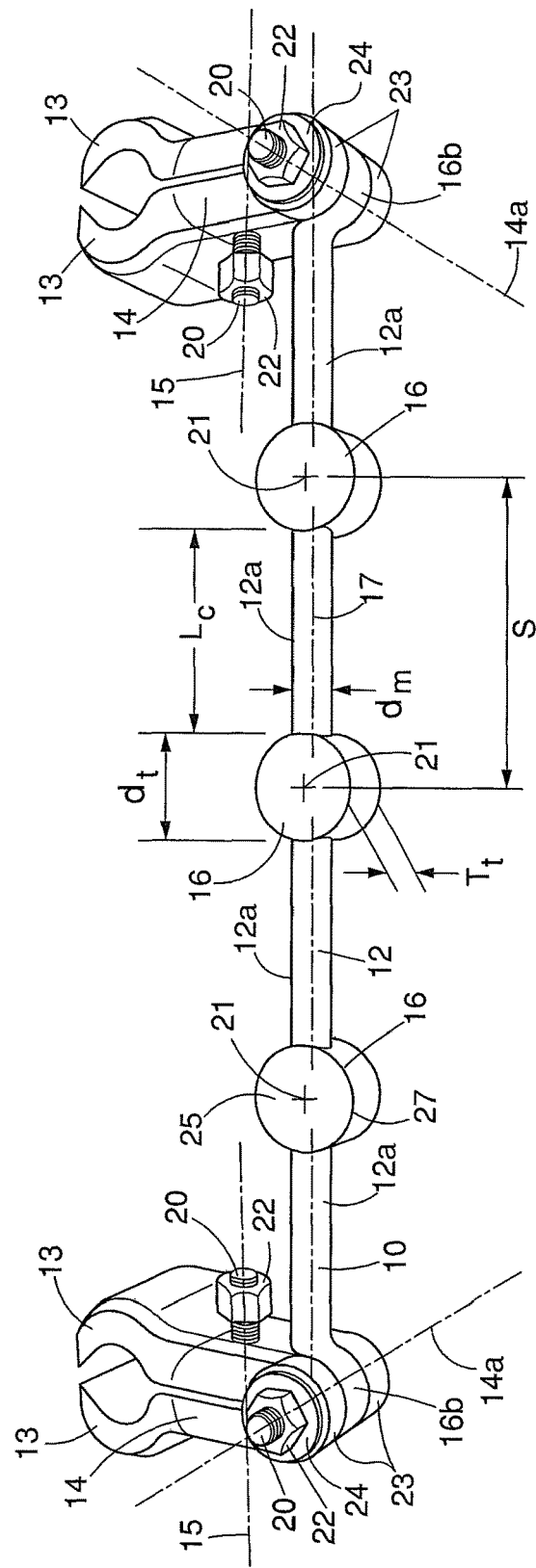
Figure 6:
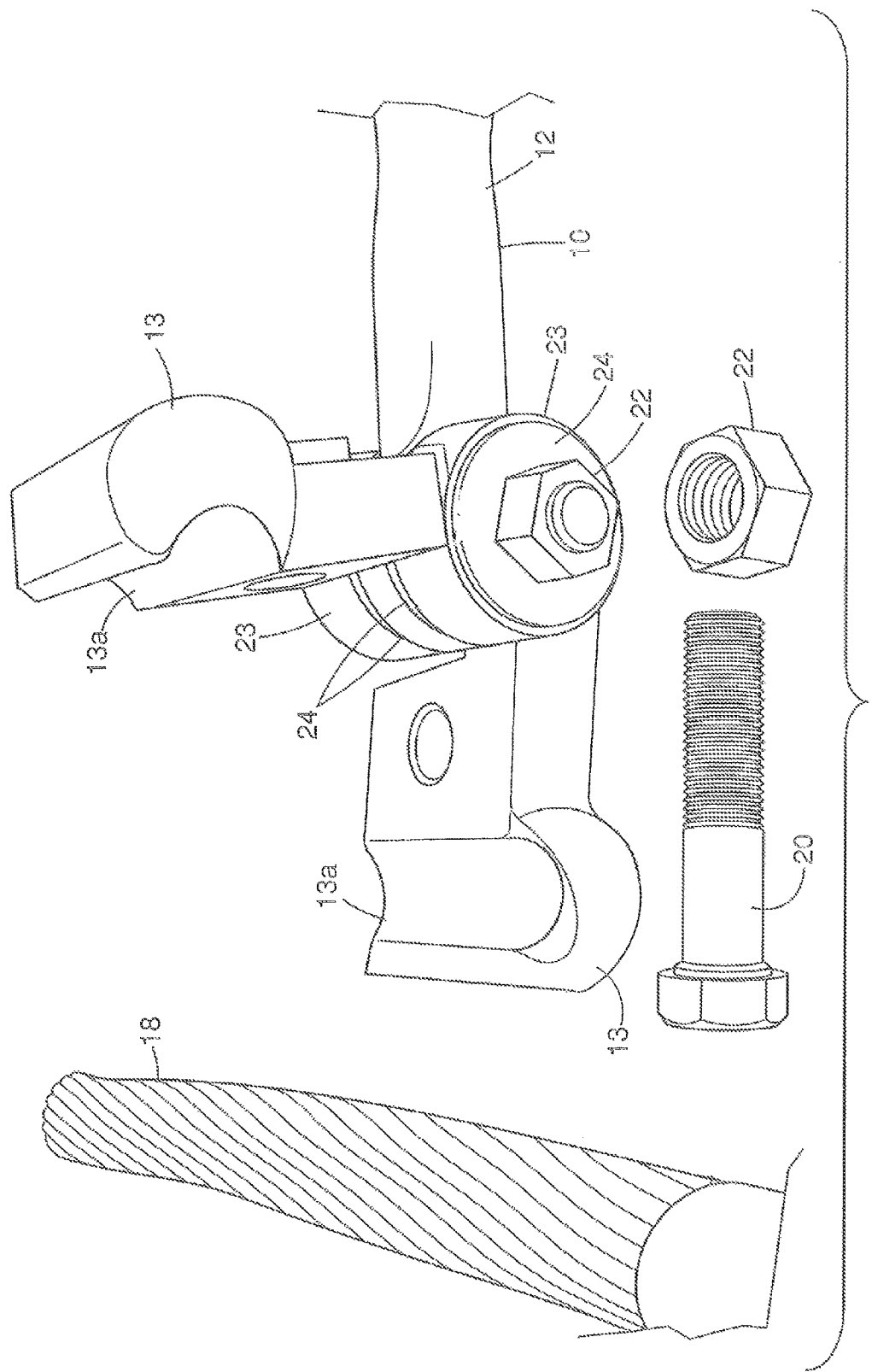
FIG. 6 is a perspective view of an embodiment of a clamp in an open position.

The thickened portions 16 can be relatively short, squat or flattened round, or curved bulges that can be cylindrical, puck, or disc shaped, with their central axes 21 transverse, orthogonal or at a right angle to the spacer rod 12 and axis 17. The thickened portions 16 can have a round or curved outer diameter or perimeter surface 27, and flat end surfaces 25 on opposite axial ends (FIGS. 3 and 4). The flat end surfaces 25 can be parallel to each other and axis 17, and transverse or orthogonal or at right angles to axes 21. The thickened portions 16 can be formed by casting, and can be cast at the same time integrally together with the spacer rod 12, for example, out of aluminum. The use of aluminum for spacer rod 12 and clamps 14 can minimize the weight. Casting the thickened portions 16 integrally together with the spacer rod 12 can save manufacturing time. In addition, less material is used than if the spacer rod 12 had a constant or continuous diameter that is large enough to withstand the desired buckling force F. Using less material can decrease the weight and the cost of the spacer device 10.

By positioning the thickened portions 16 at intermediate locations along the spacer rod 12, the intermediate thickened portions 16 can form two or more short spaced apart Euler column lengths 12a along axis 17, having the nominal or minimum thickness or diameter of the spacer rod 12, which are separated from each other by the thickened portions 16. The thickened portions 16 can be made long and large enough not to bend themselves, and to act as fixed end supports for the Euler column lengths 12a of the spacer rod 12. Consequently, each shortened column length 12a can resist higher compressive Euler buckling forces than the spacer rod 12 could resist if the thickened portions 16 were not present. Euler buckling forces are typically compressive forces acting on a column at the ends of the column in the direction of or along the longitudinal axis, which if large enough, can cause buckling of the column. A column subjected to such forces can be described or designated as a Euler column. The strength of a given Euler column is related to the square of the column length. For example, if a given Euler column is shortened by a factor of two by a thickened portion 16, the column can be increased in strength by a factor of four. The column lengths 12a typically have a round cross section which can provide uniform strength in all radial directions, but alternatively can have other cross sectional shapes, such as square, rectangular, hexagonal, octagonal, polygonal, oval, complex curves, etc.

The use of the thickened portions 16 can allow the nominal or minimum thickness or diameter of the spacer rod 12 to be made smaller than if the spacer rod had a constant diameter large enough to withstand the desired buckling force F, thereby minimizing the weight. In addition, by using thickened portions 16 that are round or cylindrical in shape, with the central axis 21 transverse, orthogonal or at a right angle to the spacer rod 12 and axis 17, the thickened portions 16 can have a configuration that is large enough, and long enough in the direction of axis 17 to act as fixed end supports to form a series of Euler type columns extending along axis 17 that are separated from each other, while also minimizing weight and material. The cylindrical shape with flat opposed surfaces 25 minimizes weight on the opposite axial ends along axis 21, and the curved outer perimeter surface 27 maximizes the length of the thickened portion 16 between the column lengths 12a in the direction of axis 17 while also minimizing weight. The curved outer perimeter surface 27 extends the length of the cylindrical thickened portion 16 along the junction with the column lengths 12a, while minimizing material and weight at radially outward locations away from the spacer rod 12. The length of the thickened portion 16 if too short, might not sufficiently act as an end support and might not provide sufficient strength. In addition, the thickened portions 16 can also have a central hole 16a (FIG. 8A) to further minimize weight. Minimizing weight is desirable for use on electrical transmission lines, cables or conductors.

The clamps 14 can include two opposed jaws 13 having hub portions 23, that can be rotatably connected to each other about axis 14a on opposite sides of end portions 16b of spacer rod 12, by bolts 20, washers 24 and nuts 22 (FIGS. 3-6). The end portions 16b can be generally cylindrical or disc shaped and can have central axis 21 similar to thickened portions 16. The end portions 16b can form end supports for the adjacent column lengths 12a, alone or in combination with the clamps 14 and can be thinner than thickened portions 16 if needed for positioning or securing between hub portions 23. The end portions 16b can have hole 16a to allow bolts 20 to pass through. The jaws 13 can have contoured, curved or rounded jaw portions 13a for gripping and clamping a conductor 18 when bolts 20 on axis 15 of clamp 14, and nuts 22 are tightened to bring jaws 13 towards each other. The bolts 20 along axes 14a can be tightened to lock clamps 14 in a fixed positioned 14a relative to spacer rod 12, or set, or replaced with a pin to allow rotation about axes 14a of the clamps 14 relative to spacer rod 12. Nuts 22 can be lock nuts to prevent loosening. Washers 24 can be positioned on opposite sides of hub portions 23 and end portions 16b to rattle and absorb or dissipate vibrational energy. Selected washers 24 can be included that are neoprene or rubber washers to reduce noise. Additional washers 24 can be added as needed to absorb vibration, and bolt 20 can be lengthened accordingly. Further washers 24 can also be added loosely to the thickened portions 16 with bolts through holes 16a in the embodiment of the spacer rod 12 seen in FIG. 8A, for absorbing or dissipating vibration. Resilient or flexible, viscoelastic, polymeric, neoprene or rubber members, sheaths sleeves or layers 26 can be positioned over each conductor 18 at the locations at which the clamp 14 clamps the conductor 18 and become sandwiched between the clamp 14 and the conductor 18. The addition of a rubber sleeve 26 can be used to control high frequency vibration. Although one embodiment of clamps 14 is shown in the drawings, other suitable clamps can be employed. In addition, clamp 14 can be, or can be similar to those disclosed in U.S. Pat. No. 6,008,453, issued Dec. 28, 1999, the contents of which is incorporated herein by reference in its entirety.

In some embodiments, the spacer rod 12 can be about 1½ or 2 to 3 feet long, and about ⅝ to ¾ inches in nominal or minimum thickness or diameter $d_m$ (FIG. 3). The thickened portions 16 can have a length or diameter $d_t$ of about 1½ or 2 to 2½ inches, can have a thickness $T_t$ of about ¾ or 1 to 2 inches thick, and can be spaced apart about 5 or 6 to 8 inches, and in some cases up to 9 to 11 inches. In some embodiments, the spacer rod 12 can have two thickened end portions 16b at opposite ends, and three intermediate thickened portions 16 therebetween to form four separated Euler column lengths 12a positioned along axis 17 in series or sequence. The column lengths 12a of the spacer rod 12 can have a length $L_c$ ranging from about 3 to 9 inches long. For a length, distance or span S of the spacer rod 12 between the centers of two thickened portions 16 or end portions 16b, in some embodiments, about 50% or 55% to 80% of the length of the span S can be the column length 12a having the nominal thickness or diameter $d_m$, and about 20% to 45% or 50% of the length of the span S can be the thickened portions 16 or end portions 16b. The thickened portions 16 can be about ⅝ to 1¼ or 2⅜ inches thicker than spacer rod 12 (or about 2 to 4 times thicker). The thickened portions 16 can have a thickness $T_t$ along axis 21 orthogonal to axis 17 that is at least about 2 times the thickness or diameter $d_m$ of the spacer rod 12, and a length or diameter $d_t$ in the direction of axis 17 that is also at least two times the thickness or diameter $d_m$, and can be at least three times the thickness or diameter $d_m$, in order to form Euler type end supports. The thickness or diameter $d_t$ of the thickened portions 16 can also be at least two or three times the thickness or diameter $d_m$ in the radial direction orthogonal to both axes 17 and 21, at the radially outward most point on the outer perimeter surface 27. The thickened portions 16 can have an opening 16a if desired (FIG. 8A). In other embodiments, the thickened portions 16 can have other suitable shapes and configurations, and can be separately manufactured pieces which are secured to the spacer rod 12. The number and spacing of thickened portions 16 can vary, as well as the nominal thickness or diameter $d_m$ of the spacer rod 12.

The column lengths 12a can have a column length $L_c$ to nominal or minimum diameter or thickness $d_m$ ratio $L_c/d_m$ of about 5 to 18, often about 5 to 12, or 5 to 8. The thickened portion 16 thickness $T_t$ and the column length 12a thickness or diameter $d_m$ can have a ratio $T_t/d_m$ of about 1.5 to 3, and often about 1.75 to 2.5. The thickened portion 16 length or diameter $d_t$ and the column length 12a thickness or diameter $d_m$, can have a ratio $d_t/d_m$ of about 2 to 5 and often about 2.5 to 3.5. This can help provide a spacer rod 12 having maximum strength against Euler type buckling with a minimum weight.

In one embodiment, spacer device 10 can have a spacer rod 12 which is about 24 inches long between the axes 21 of the two end portions 16b, which when clamps 14 are attached that have a distance of about 3 to 4 inches between axis 14a and jaw portions 13a, can space conductors 18 apart from each other about 30 to 32 inches. The spacer rod 12 can have three intermediate thickened portions 16 spaced apart from each other and the end portions 16b by a distance or span S of about 6 inches between center axes 21 to form four Euler column lengths 12a in series separated from each other along axis 17. The column lengths 12a can have a nominal or minimum diameter $d_m$ of about ⅝ inches and a length $L_c$ of about 4 inches. The thickened portions 16 can have a length or diameter $d_t$ of about 2 inches and a thickness $T_t$ of about 1¼ inches. The end portions 16b can have a diameter of about 2 inches and a thickness of about 0.68 or 11/16 inches. The holes 16a can be about ⅝ inches in diameter. This can provide a $L_c/d_m$ ratio of about 6 to 7, such as about 6.4, a $t_c/d_m$ ratio of about 2, and a $d_c/d_m$ ratio of about 3.2. Although column lengths 12a are shown to have a diameter with a smooth outer surface, it is understood that the outer surface can have corrugations or irregularities.

In some embodiments, the maximum allowed stress on an aluminum column length 12a is about 10,000 lb/in². For a column length 12a having a minimum diameter $d_m$ of about ½ inch, maximum loads for various column lengths $L_c$, can be as follows: for $L_c$ of 6 inches about 1848 lbs, for $L_c$ of seven inches about 1807 lbs, for $L_c$ of 8 inches about 1759 lbs, and for $L_c$ of 9 inches about 1705 lbs. For a column length 12a having about a 0.7 inch diameter, the following maximum loads for various column lengths $L_c$ can be as follows: for $L_c$ of 6 inches, about 3733 lbs, for $L_c$ of 7 inches about 3692 lbs, for $L_c$ of 8 inches about 3644 lbs, and for $L_c$ of 9 inches about 3590 lbs. These spacer rods 12 can be heat treated. In compressive testing where the spacer rod 12 is subjected to a compressive force exerted at the end portions 16b via bolts through holes 16a (for example ⅝ diameter bolts), from a compressive test machine, embodiments of the spacer rod 12 when heat treated can buckle at about 2200 lbs, and at about 2440 lbs if the bolts through the end portions 16b are tightened to about 100 ft/lbs to prevent rotation. Embodiments of the spacer rod 12 that are not heat treated can buckle at about 3130 lbs, and at about 3780 lbs if the bolts through the end portions are tightened to about 100 ft/lbs.

In some embodiments, when the spacer device 10 is cast from aluminum, the spacer rod 12 can weigh about 21 lbs and the clamps 14 about 3 lbs each. The bolts 20 and nuts 22 can be about 2 lbs for each set. This can provide spacer device 10 with a light weight to allow faster and easier installation on an electrical transmission line from a helicopter.

Figure 8B:
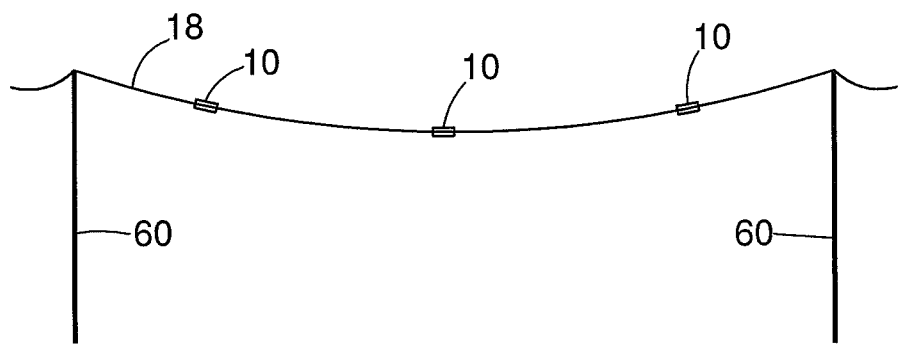
FIG. 8B is a schematic drawing of a conductor span which has a series of spacer devices secured thereto.
Figure 8C:
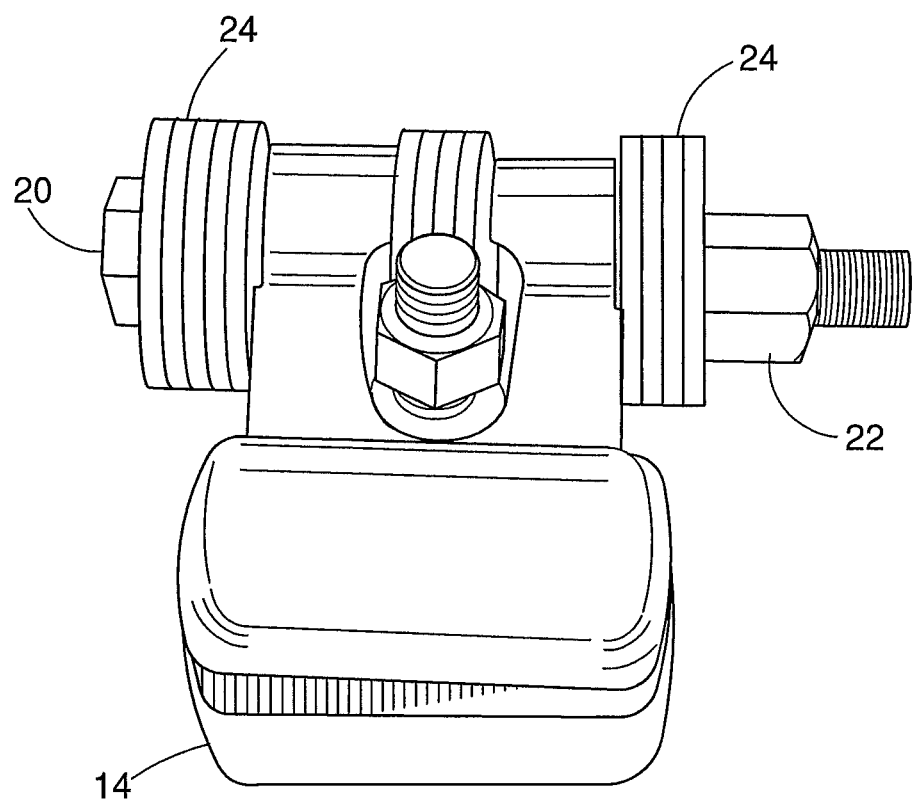
FIG. 8C is a perspective view of an embodiment of a clamp having a series of loose washers.
Figure 8D:
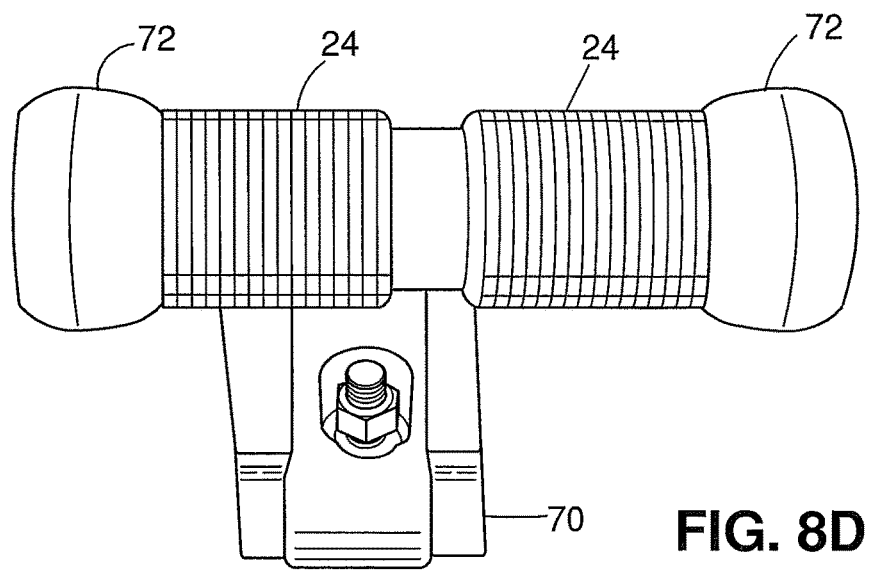
FIG. 8D is a perspective view of another embodiment of a clamp having a series of loose washers.

In some embodiments, for a 600 foot span, 3 spacer devices 10 can be secured to and spaced along the span about 200 feet from each other. Referring to FIG. 8B, the spacer devices 10 on the ends of the span near the towers or poles 60 can have clamps 14 which are tightened to prevent rotation of the clamps 14 relative to the spacer rod 12 and the center spacer device 10 can have clamps 14 that are able to rotate relative to the spacer rod 12 to twist the conductors 18 to control gallop. The center spacer device 10 can include extra loose washers 24 for controlling or dissipating vibration. The end spacer devices 10 do not have to include extra loose washers 24. FIG. 8C depicts a clamp 14 including extra loose washers 24. In some embodiments, the clamp 14 can range from about 15/16 inches to 1 7/16 inches in steps of 1/16 inch. The width of the gripping portion can be about 3½ inches. FIG. 8D depicts another clamp 70 having a series of loose washers 24 and corona donuts 72 to shield the nut 22 and head of bolt 20 against corona. Some embodiments can dissipate frequencies from 5 HZ to 50 HZ. In some embodiments, for a span of conductors 18 that is about 1200 feet on an electrical transmission line, 7 spacer devices 10 can be secured to the conductors 18 and spaced apart on the span to reduce or prevent galloping. In such a span, two spacer devices 10 near the center can have rotating clamps 14 with loose washers 24.

Figure 9:
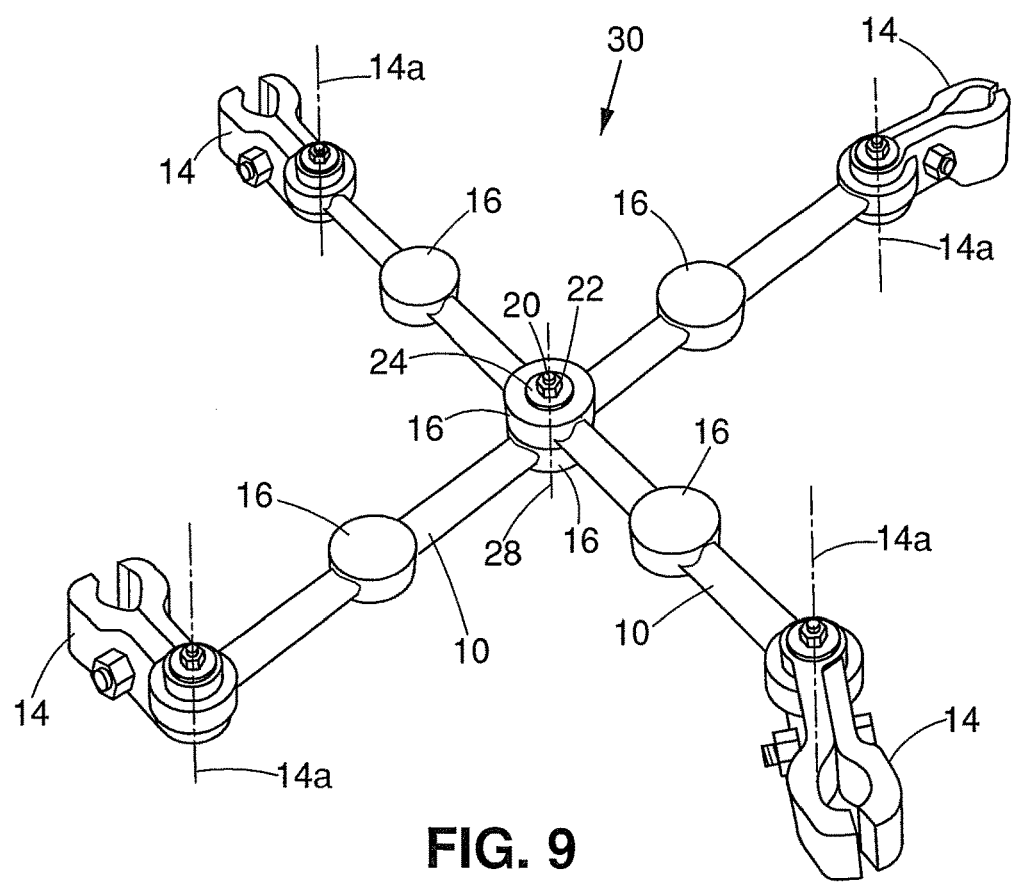
FIG. 9 is a perspective view of another embodiment of a spacer device in the present invention.
Figure 10:
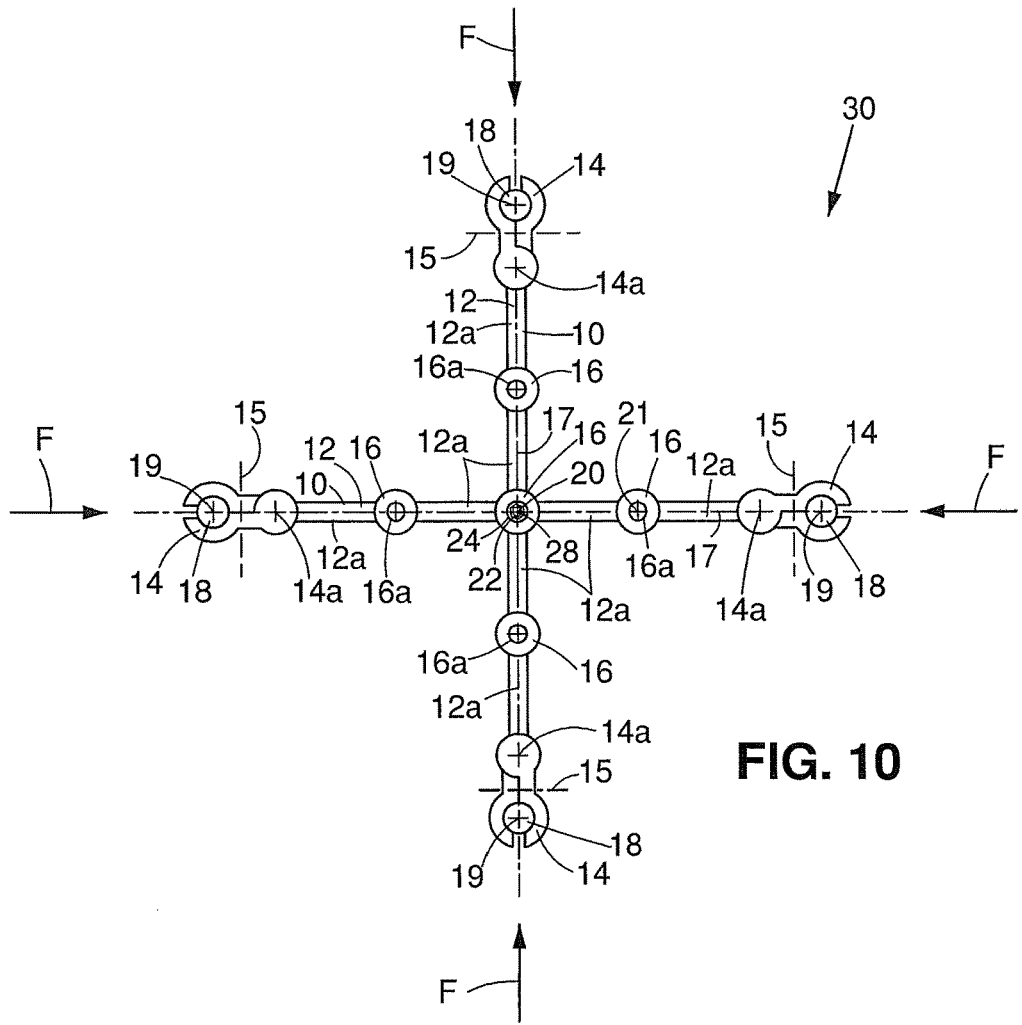
FIG. 10 is a side view of the spacer device of FIG. 9.
Figure 11:
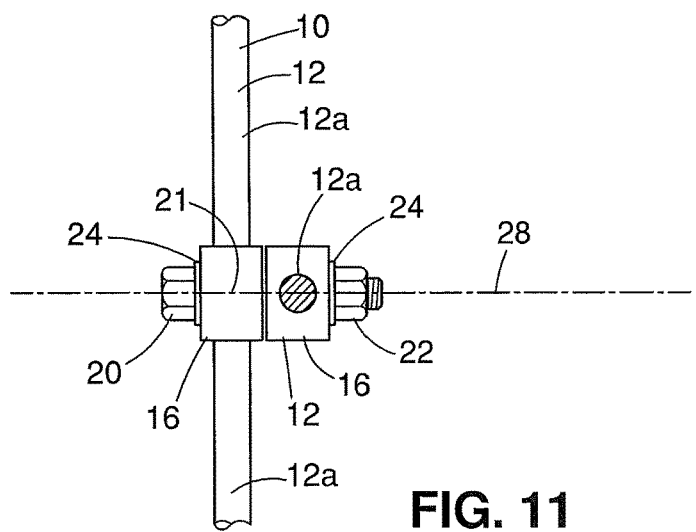
FIG. 11 is a side view of the central hub joint of the spacer device of FIG. 9.

Referring to FIGS. 9-11, two spacer devices 10 can be joined together at their respective central or middle thickened portions 16 along a common central axis 28 by a bolt 20, washers 24 and nut 22, to form a quad spacer device 30. This can be used to clamp, space and dampen four conductors 18 in a quad bundle. Referring to FIG. 10, one spacer device 10 is shown horizontally oriented, and the other or second spacer device 10 is shown vertically oriented, but it is understood that other orientations are also envisioned. Although FIG. 10 shows two spacer devices 10 joined together of equal length, in some embodiments, one spacer device 10 can have a length for spacing two conductors 18 apart from each other about 30 to 32 inches, for example, in the horizontal direction and the second spacer device can have a length for spacing two conductors 18 apart from each other about 18 inches, for example, in the vertical direction. In other embodiments, three spacer devices 10 can be joined together to clamp, space and dampen a bundle of six conductors 18. Furthermore, a bundle of three conductors 18 can be clamped, spaced or dampened using either two spacer devices 10 joined together, or with a truncated spacer rod 12 joined to spacer device 10. The modular ability of multiple spacer devices 10 to be joined together allows spacer devices to be formed to space different conductor bundles having varying numbers of conductors 18.

Referring to FIGS. 12 and 13A, in some embodiments, the region of the cable or conductor 18 at which a spacer device 10 is secured by clamp 14 can have a resilient or flexible, viscoelastic, polymeric, neoprene, or rubber sheath, sleeve or layer 26 covering the conductor 18. The sleeve 26 can be covered by a metallic covering such as a series of members or rods, for example, armor rods 64, which can be cylindrical or have other suitable cross sectional shapes. The clamp 14 is clamped over the sleeve 26 and armor rod 64 sandwich. The sleeve 26 and armor rod 64 sandwich can create a vibration damper where energy can be dissipated in the constrained viscoelastic layer to control high frequency vibrations. In some embodiments, the sleeve 26 can be about ⅛ inch thick, have a durometer rating of about 40, can be about 4 to 5 feet long with a longitudinal slit or split to allow installment, and the armor rods 64 can be about 6 to 7 feet long, where the ends of the armor rods 64 can be brought back into contact with the conductor 18, such as by wrapping the individual rods around the conductor 18. The armor rods 64 can be metallic and can be formed of metal strands that are formed in a twisted or helical configuration. The armor rods 64 used can be those that are commonly commercially available. In some embodiments, 15 armor rods 64 can cover or be wrapped around the sleeve 26. The armor rods 64 can maintain pressure on the sleeve 26 and can have some flexibility or resiliency to deform for absorbing vibration or galloping. The length of the sleeve 26 and armor rod 64 sandwich can dampen bending stresses on the conductor 18 near the clamps 14. The sleeve 26 can deform in shear when the conductor 18 bends underneath the clamp 14, constituting a loss of energy in each cycle of vibration. In some embodiments, the sleeve 26 and armor rods 64 can be used with other damping or spacer damping devices or clamps. In other embodiments, the sleeve 26 and armor rods 64 can be used with other suitable spacer devices, or with a clamp 14 or other suitable clamp that is not attached to or part of a spacer device. Clamping armor rods 64 and sleeves 26 around cables or conductors 18 with a clamp can in itself be used as a damping device. Furthermore, the armor rods 64 and sleeves 26 can have other configurations and dimensions as desired.

Referring to FIG. 13B, in another embodiment, the armor rod 64 and sleeve 26 sandwich can be clamped over a conductor 18 by a clamp 14 mounted to a member 62 extending from a transmission tower or pole 60. The clamped armor rod 64 and sleeve 26 configuration can be used to control high frequency vibration as well as galloping. The clamp 14 can be rigidly or rotatably mounted to the member 62 as desired. In some embodiments, the member 62 can be an insulator attached to the tower or pole 60, and can be in a horizontal line post configuration as shown, or can have other configurations such as a suspension configuration where the upper end of the member is mounted to pole 60, or a braced configuration. In other embodiments, other suitable clamps can be attached to the member 62.

In addition to wind loads on electrical transmission lines, cables or conductors 18, another possible loading condition can be short circuit loading. This can occur when there is a line fault and the current may change from a normal value of about 1,000 amps to a short circuit value of 25,000 amps or more. Circuit breakers at the sub-station will react quickly, in about ten cycles or a time span of 0.10 seconds. In a bundled circuit, the phase conductors 18 will be electromagnetically attracted to each other. In a twin bundle, two conductors 18 will start to move toward the middle of the bundle. In a triple bundle, three conductors 18 will start to move. In a quad bundle, four conductors 18 will start to move. If the spacer devices 10 are oversized, for example, 30 to 32 inches instead of the pre-existing standard of 18 inches, the force of the attraction between the conductors 18 is much less in the 30 to 32 inch spaced bundle than for the 18 inch bundle due to the increased spacing or distance apart. Since each bundle is a dynamic system having mass and stiffness, the motion is governed by Newton's laws of motion, and is not instantaneous, and will be determined by the natural modes of vibration. So, while the short-circuit current is instantaneous, and the relay operation occurs within a 0.1 second time frame, the force F moving the conductors 18 towards each other is an impulse in time over a time period of 0.1 second.

The use of oversized spacer devices 10 of 30 to 32 inches has many desired benefits which include, (i) increase the power delivery capacity of the transmission line over long distances, (ii) strengthen the ability of the bundle to resist forces F caused by short circuits, (iii) increase the wind speed at which galloping may occur, and (iv) prevent sub-conductor oscillation in large diameter sub-conductors.

Figure 14:
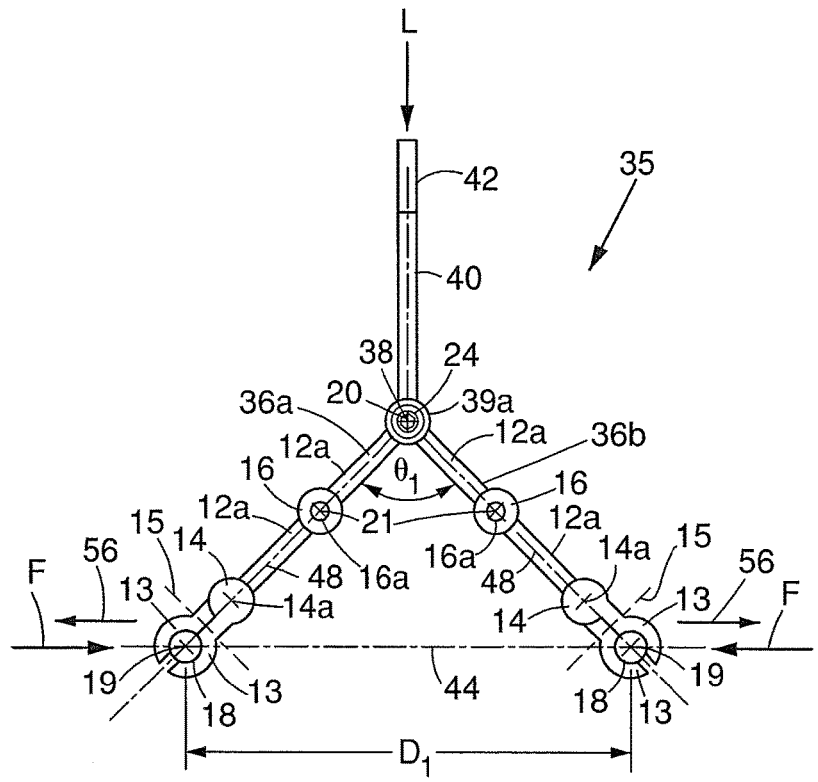
FIG. 14 is a side view of an embodiment of a spreading tool in the present invention, positioned for spreading two conductors.
Figure 15:
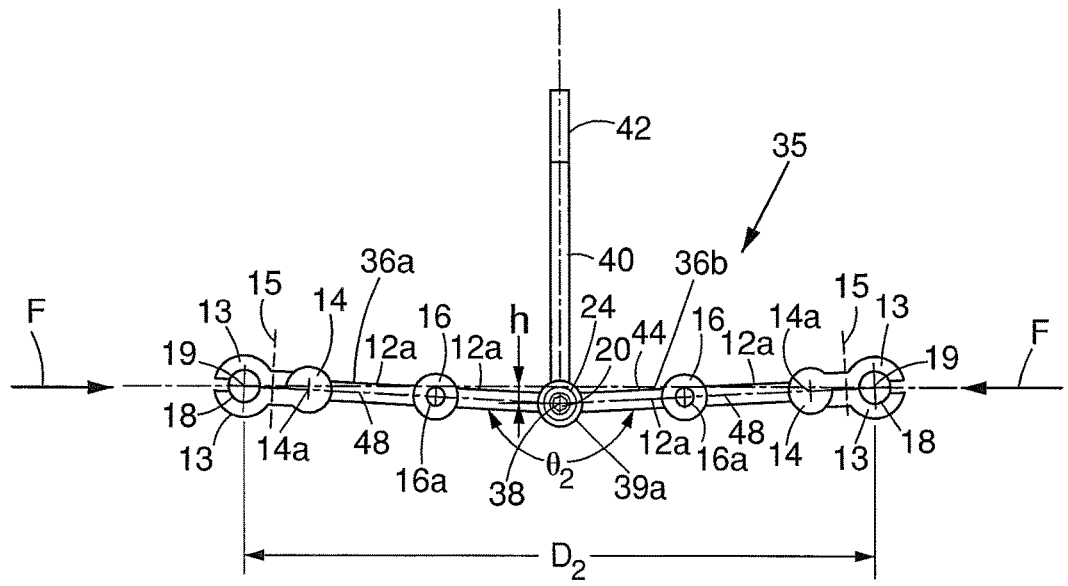
FIG. 15 is a side view of the spreading tool of FIG. 14 after spreading the conductors apart.
Figure 16:
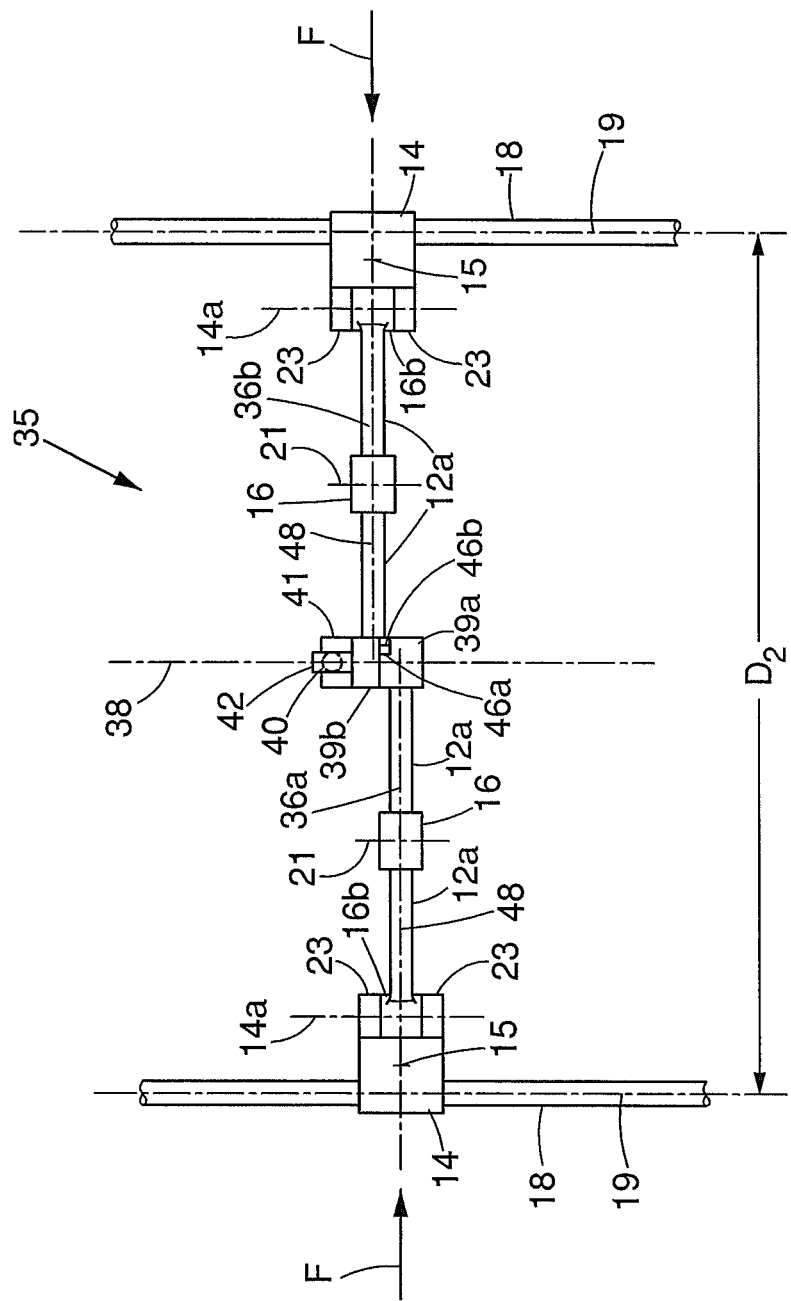
FIG. 16 is a top view of FIG. 15.
Figure 18:
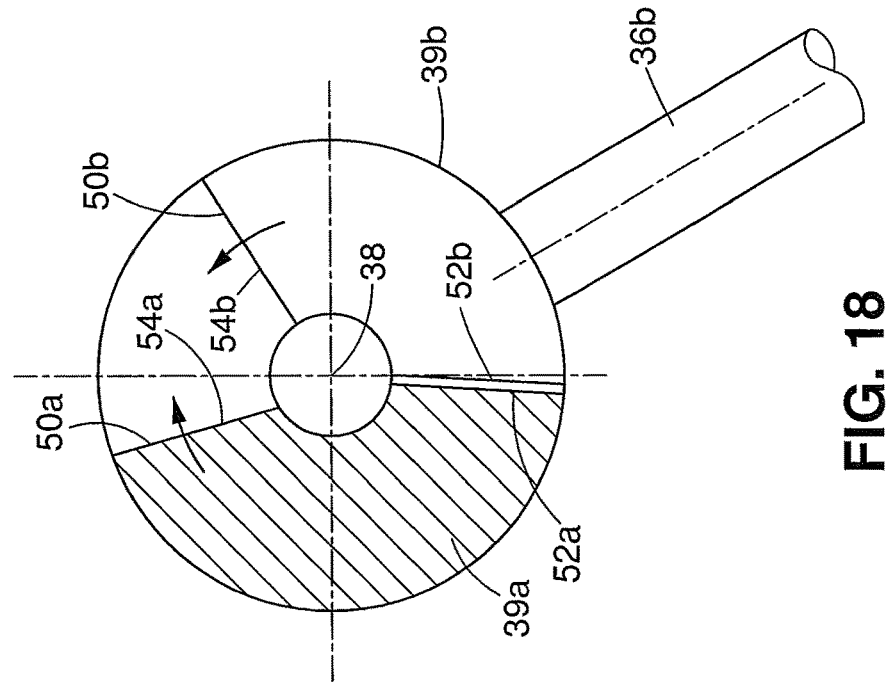
FIG. 18 is a sectional view of the hub portion showing an embodiment of a mechanical stop.
Figure 17:
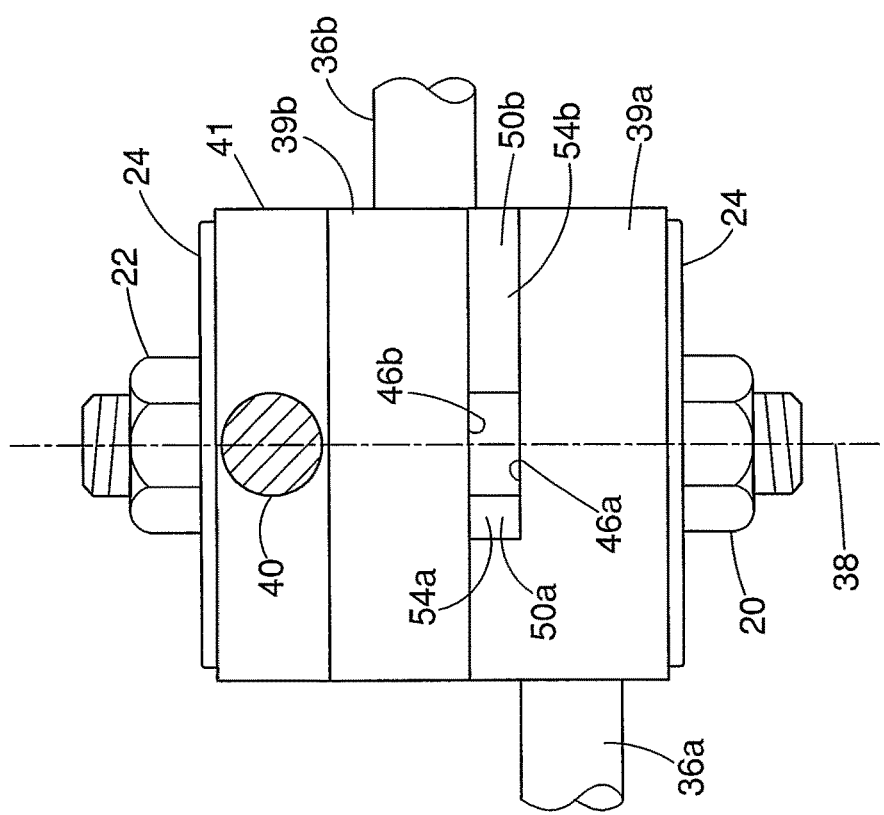
FIG. 17 is an enlarged top view of the hub portion.

Referring to FIGS. 14-16, spreading tool or device 35 can be used for spreading conductors 18 apart from each other and maintaining a fixed spread distance for the attachment of a spacer device 10. The spreading tool 35 can have first 36a and second 36b spreading arms with respective hubs 39a and 39b at their proximal ends. The spreading arms 36a and 36b can be rotatably or pivotably connected together at hubs 39a and 39b along a pivot point or axis 38 by bolt 20, nut 22 and washers 24. The spreading arms 36a and 36b can have a construction similar to that of spacer device 10, in that the arms 36a and 36b can have column lengths 12a, thickened portions 16, and end portions 16b extending along longitudinal axes 48. Clamps 14 can be secured to the distal ends of the arms 36a and 36b at end portions 16b. The dimensions of these features can be similar to those previously described. In the embodiment depicted, each arm 36a and 36b can have two column lengths 12a that are separated from each other by a thickened portion 16. A handle 40 having a knob 42 can also be rotatably or pivotably connected along pivot point or axis 38 to the spreading arms 36a and 36b. The handle 40 has a hub 41 which can be rotatably secured to hubs 39a and 39b by the bolt 20, nut 22 and washers 24. Referring to FIG. 16, hubs 39a and 39b can each have a notch 46a and 46b forming a mechanical stop 50a and 50b (FIGS. 17 and 18) which can interact to permit rotation of the arms 36a and 36b relative to each other between an acute angle $\theta_1$, and a reflex angle $\theta_2$ that is just slightly beyond 180° by a few degrees, as seen in FIGS. 14 and 15. The mechanical stops 50a and 50b can have first stop surfaces 52a and 52b, which can engage each other when the arms 36a and 36b are at angle $\theta_1$, to prevent further rotation in that direction, and can also have second stop surfaces 54a and 54b, which can engage each other when the arms 36a and 36b are at angle $\theta_2$ to prevent further rotation in that direction.

One use of the spreading tool 35 can be for installing spacer devices 10 that space conductors 18 about 30 to 32 inches apart from each other in a bundle having conductors 18 that are currently spaced only 18 inches apart. Referring to FIG. 14, the clamps 14 of the spreading tool 35 can be tightened in a rigid or fixed position relative to arms 36a and 36b, and positioned over or around the conductors 18 in a loose manner. For example, the jaws 13 can have about a ¼ gap clearance around the conductors 18 to allow for rotation of the conductors 18 within clamps 14. Clearance can also allow easy insertion of the conductors 18 into the clamps 14. The length of each arm 36a and 36b can be sized such that when the spreading tool 35 is held by handle 40, the arms 36a and 36b can hang downward by gravity and are at angle $\theta_1$ by the nature of mechanical stops 50a and 50b. The distance $D_1$, between the clamps 14 when arms 36a and 36b are at angle $\theta_1$ can be about 18 inches to match the 18 inch distance between the longitudinal axes 19 of the conductors 18, thereby allowing quick and easy engagement of the jaw portions 13a of the clamps 14 from above by a user on a helicopter. In some embodiments the angle $\theta_1$ can be about 60°. The user then can push downwardly on the handle 40 with a force or load L which pivots the arms 36a and 36b about axis 38 relative to each other while moving the axis 38 downwardly or toward the axis 44 extending between both conductors 18 from axes 19. This moves the clamps 14 and the conductors 18 outwardly relative to each other in the direction of arrows 56, until the mechanical stops 50a and 50b prevent further rotation of the arms 36a and 36b at the reflex angle $\theta_2$, where the axis 38 of hubs 39a and 39b are at a position offset, past or below axis 44 by a distance h, for example, ⅛ to ¼ inches (FIG. 15). As the arms 36a and 36b pivot, clamps 14 can rotate relative to the conductors 18 due to the loose manner in which the clamps 14 are positioned around the conductors 18. In some embodiments, the angle $\theta_2$ can be about 182° to 185°. In this position, the forces F pushing the conductors 18 towards each other lock the arms 36a and 36b in place, whereby the distance $D_2$ between the jaw portions 13a of the clamps 14 and the conductors 18 can be about 30 to 32 inches. A spacer device 10 for spacing conductors 18 a distance $D_2$ of about 30 to 32 inches can now be installed to achieve the benefits previously mentioned. Once the spacer device 10 is installed, the spreading tool 35 can be removed by pulling on the handle 40 to disengage the arms 36a and 36b from the conductors 18. In some situations, the handle 40 can be rotated about axis 38 to the opposite side whereby the arms 36a and 36b can be spread by pulling the handle 40, and removed by pushing.

In some embodiments, the mechanical stops 50a and 50b, and arms 36a and 36b, can be configured to provide other angles $\theta_1$ and distances $D_1$ and $D_2$, as desired. The mechanical stops 50a and 50b can have other suitable configurations, and can be located outside the hubs 39a and 39b. The clamps 14 can be set to rotate relative to arms 36a about axes 14a, if desired. Although clamps 14, and arms 36a and 36b having a similar design to spacer device 10 are shown, it is understood that in some embodiments, the arms 36a and 36b can have other suitable configurations. For example, the arms 36a and 36b can be formed of round, oval, square, rectangular, polygonal or complex curved tubing or solid members, or can have an I beam cross section. In addition, a version of the clamps 14 can be integrally formed with the arms 36a and 36b, or the clamps 14 can be omitted, with the arms 36a and 36b having slots or openings for engaging the conductors 18. Although the spreading tool 35 is typically formed of aluminum, alternatively, other suitable materials can be employed such as steel, wood, composites, fiberglass, etc.

While this invention has been particularly shown and described with references to example embodiments thereof, it will be understood by those skilled in the art that various changes in form and details may be made therein without departing from the scope of the invention encompassed by the appended claims.

For example, the devices described above and shown in the drawings are not limited for use with electrical transmission lines, but can also be used for support or suspension cables, for example, towers, bridges, etc. In addition, the sizes or dimensions of the devices and their features can vary depending upon the application at hand. Although the components are typically integrally cast from aluminum for weight and manufacturing purposes, it is understood that other suitable metals and materials can be used, and that other configurations of the components and manufacturing methods can be employed.

What is claimed is:

1. A method of spacing two electrical transmission lines with a spacer device comprising:
   securing an elongate spacing member to the two electrical transmissions lines, the elongate spacing member extending along a longitudinal axis and having a minimum thickness $d_m$, at least one thickened portion having a thickness $T_t$ and length $d_t$ being positioned intermediate along the spacing member to form at least two column lengths $L_c$ separated by the at least one thickened portion, each column length $L_c$ having a portion with the minimum thickness $d_m$, the thickness $T_t$ and length $d_t$ of the at least one thickened portion being at least two times the minimum thickness $d_m$ to form at least one end support for the at least two column lengths $L_c$, the spacing member having a column length to minimum thickness $L_c/d_m$ ratio of about 5 to 18, a thickened portion thickness to spacing member minimum thickness $T_t/d_m$ ratio of about 1.5 to 3, and a thickened portion length to spacing member minimum thickness $d_t/d_m$ ratio of about 2 to 5, such that the at least two column lengths $L_c$ behave as separate Euler type columns for producing increased Euler buckling strength with a minimal increase in weight.

2. The method of claim 1 further comprising providing the thickened portion with a thickness $T_t$ that is at least two times the minimum thickness $d_m$ of the spacing member, and a length $d_t$ that is at least three times the minimum thickness $d_m$.

3. The method of claim 1 further comprising providing a $L_c/d_m$ ratio of about 6 to 7.

4. The method of claim 3 further comprising providing a $T_t/d_m$ ratio of about 1.75 to 2.5.

5. The method of claim 4 further comprising providing a $d_t/d_m$ ratio of about 2.5 to 3.5.

6. The method of claim 1 in which the spacing member is a rod, the method further comprising providing the rod with a length of about 1½ to 3 feet long and a minimum thickness $d_m$ of about ⅜ to ¾ inches.

7. The method of claim 6 further comprising providing the at least one thickened portion with a thickness $T_t$ of about 1 to 2 inches and a length $d_t$ of about 1½ to 2½ inches.

8. The method of claim 7 further comprising integrally forming the at least one thickened portion on the spacing member.

9. The method of claim 8 further comprising spacing at least two thickened portions apart about 5 to 11 inches.

10. The method of claim 1 further comprising providing the at least one thickened portion with a cylindrical shape and with a central axis orthogonal to the longitudinal axis of the spacing member.

11. The method of claim 10 further comprising providing the at least one thickened portion with a diameter of about 1½ to 2½ inches.

12. The method of claim 1 further comprising securing first and second clamps that are on opposite ends of the spacing member to respective electrical transmission lines.

13. The method of claim 12 further comprising allowing the clamps to rotate relative to the spacing member.

14. The method of claim 12 further comprising spacing the two electrical transmission lines about 30 to 32 inches apart.

15. The method of claim 12 in which the elongate spacing member is a first spacing member, the spacer device further comprising a second elongate spacing member secured to the first spacing member and having at least a third clamp secured to an end of the second spacing member for securing to at least another electrical transmission line.

16. A method of spacing two electrical transmission lines with a spacer device comprising:
   securing an elongate spacing member to the two electrical transmission lines, the elongate spacing member extending along a longitudinal axis and having a minimum thickness $d_m$, at least one thickened portion being positioned intermediate along the spacing member to form at least two column lengths $L_c$ separated by the at least one thickened portion, the at least one thickened portion being shaped with a central axis orthogonal to the longitudinal axis of the spacing member, and having a length $d_t$ and thickness $T_t$ large enough to form at least one end support for the at least two column lengths $L_c$, the spacing member having a column length to minimum thickness $L_c/d_m$ ratio of about 18 or under, a thickened portion thickness to spacing member minimum thickness $T_t/d_m$ ratio of about 1.5 to 3, and a thickened portion length to spacing member minimum thickness $d_t/d_m$ ratio of about 2 to 5, such that the at least two column lengths $L_c$ behave as separate Euler type columns for producing increased Euler buckling strength with a minimal increase in weight.

17. A method of spacing two electrical transmission lines with a spacer device comprising:
   securing an elongate spacing member to the two electrical transmissions lines, the elongate spacing member extending along a longitudinal axis and having a minimum thickness $d_m$, at least one thickened portion having a thickness $T_t$ and length $d_t$ being positioned intermediate along the spacing member to form at least two column lengths $L_c$ separated by the at least one thickened portion, each column length $L_c$ having a portion with the minimum thickness $d_m$, the thickness $T_t$ and length $d_t$ of the at least one thickened portion being at least two times the minimum thickness $d_m$ to form at least one end support for the at least two column lengths $L_c$, wherein the spacing member is a rod having a length of about 1½ to 3 feet long and a minimum thickness $d_m$ of about ⅜ to ¾ inches, the at least one thickened portion having a thickness $T_t$ of about 1 to 2 inches and a length $d_t$ of about 1½ to 2½ inches, such that the at least two column lengths $L_c$ behave as separate Euler type columns for producing increased Euler buckling strength with a minimal increase in weight.

18. A method of spacing two electrical transmission lines with a spacer device comprising:

securing an elongate spacing member to the two electrical transmissions lines, the elongate spacing member extending along a longitudinal axis and having a minimum thickness $d_m$, at least one thickened portion having a thickness $T_t$ and length $d_t$ being positioned intermediate along the spacing member to form at least two column lengths $L_c$ separated by the at least one thickened portion, each column length $L_c$ having a portion with the minimum thickness $d_m$, the thickness $T_t$ and length $d_t$ of the at least one thickened portion being at least two times the minimum thickness $d_m$ to form at least one end support for the at least two column lengths $L_c$, the at least one thickened portion having a cylindrical shape with a central axis orthogonal to the longitudinal axis of the spacing member, such that the at least two column lengths $L_c$ behave as separate Euler type columns for producing increased Euler buckling strength with a minimal increase in weight.

19. A method of spacing two electrical transmission lines with a spacer device comprising:

securing an elongate spacing member to the two electrical transmissions lines, the elongate spacing member extending along a longitudinal axis and having a minimum thickness $d_m$, at least one thickened portion having a thickness $T_t$ and length $d_t$ being positioned intermediate along the spacing member to form at least two column lengths $L_c$ separated by the at least one thickened portion, each column length $L_c$ having a portion with the minimum thickness $d_m$, the thickness $T_t$ and length $d_t$ of the at least one thickened portion being at least two times the minimum thickness $d_m$ to form at least one end support for the at least two column lengths $L_c$, such that the at least two column lengths $L_c$ behave as separate Euler type columns for producing increased Euler buckling strength with a minimal increase in weight, and;

securing first and second clamps that are on opposite ends of the spacing member to respective electrical transmission lines, the elongate spacing member being a first spacing member, the spacer device further comprising a second elongate spacing member secured to the first spacing member and having at least a third clamp secured to an end of the second spacing member for securing to at least another electrical transmission line.

* * * * *